(12) United States Patent
Aubuchon et al.

(10) Patent No.: US 7,095,547 B2
(45) Date of Patent: Aug. 22, 2006

(54) MULTIPLE BEAM-DIRECTING MICROMIRROR DEVICE

(76) Inventors: Christopher M. Aubuchon, 1066 Metro Cir., Palo Alto, CA (US) 94303; Steven D. Gottke, 395 Sierra Vista Ave., Apartment #18, Mountain View, CA (US) 94043

( * ) Notice: Subject to any disclaimer, the term of this patent is extended or adjusted under 35 U.S.C. 154(b) by 0 days.

(21) Appl. No.: 11/167,378

(22) Filed: Jun. 27, 2005

(65) Prior Publication Data
US 2005/0286115 A1    Dec. 29, 2005

Related U.S. Application Data

(60) Provisional application No. 60/583,392, filed on Jun. 28, 2004.

(51) Int. Cl.
*G02B 26/00* (2006.01)

(52) U.S. Cl. .................. 359/291; 359/290; 359/223; 359/224

(58) Field of Classification Search ............... 359/290, 359/291, 223, 224, 237, 238, 292, 295, 297, 359/298
See application file for complete search history.

(56) References Cited

U.S. PATENT DOCUMENTS

| | | | |
|---|---|---|---|
| 6,334,685 B1 | 1/2002 | Slobodin | 353/84 |
| 6,457,833 B1 | 10/2002 | Ishikawa et al. | 353/99 |
| 6,567,134 B1 | 5/2003 | Morgan | 348/743 |
| 6,642,969 B1 | 11/2003 | Tew | 348/743 |
| 6,698,895 B1 | 3/2004 | Hatakeyama et al. | 353/31 |
| 6,714,353 B1 | 3/2004 | Park et al. | 359/640 |
| 6,798,560 B1 | 9/2004 | Aubochon | 359/291 |
| 6,825,968 B1 | 11/2004 | Aubochon | 359/290 |
| 6,870,659 B1 | 3/2005 | Aubochon | 359/291 |
| 2005/0111107 A1* | 5/2005 | Takeda et al. | 359/634 |

* cited by examiner

*Primary Examiner*—Timothy Thompson
(74) *Attorney, Agent, or Firm*—DLA Piper Rudnick Gray Cary US LLP

(57) ABSTRACT

A reliable micromirror device for imaging applications is presented. The device includes a projection lens assembly and an array of micromirrors for fast and efficient color separation and projection. Each of the micromirrors simultaneously receives a plurality of light beams. The position of a micromirror in the array of micromirrors is adjustable such that the micromirror selects one of the plurality of light beams to direct toward the projection lens assembly. Each micromirror also has an "off" position where none of the reflected light beams is directed toward the projection lens assembly. An image is formed when each of the micromirrors in the array either directs one of the light beams toward the projection lens assembly or is turned "off." The device may include a total internal reflection prism assembly that separates the light beams for improved contrast.

14 Claims, 12 Drawing Sheets

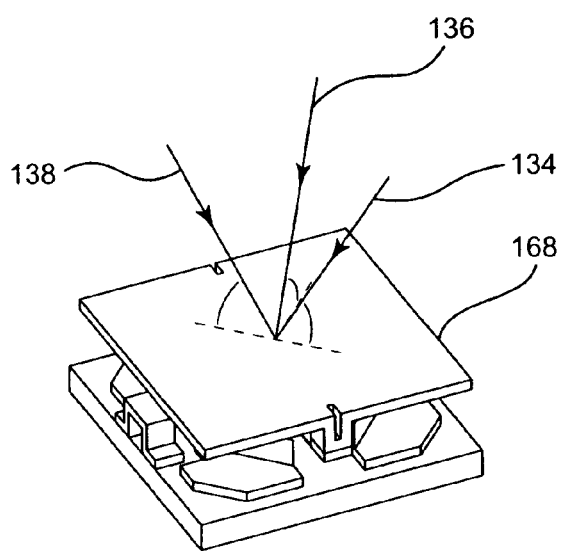
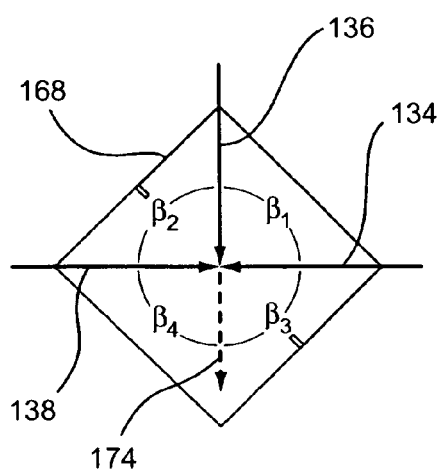
FIG. 7A                     FIG. 7B
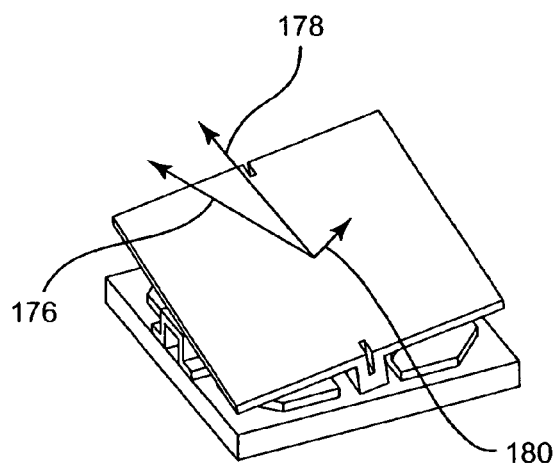
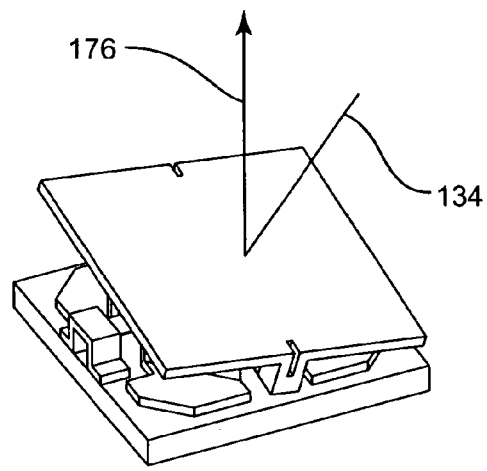
FIG. 7C                     FIG. 7D

MULTIPLE BEAM-DIRECTING MICROMIRROR DEVICE

RELATED APPLICATION

This invention claims the benefit of U.S. Provisional Application Ser. No. 60/583,392 filed on Jun. 28, 2004, the content of which is incorporated by reference herein.

FIELD OF INVENTION

The present invention relates generally to the field of spatial light modulators and particularly to a micromirror array.

BACKGROUND OF THE INVENTION

Image display systems using a spatial light modulator (SLM) have grown increasingly popular for use in projection systems. One common type of light modulator is that of a transmissive LCD (liquid crystal display) panel. In this type of device, polarization of light through a pixel is rotated to turn each one on or off. Typically, switching speeds of an LCD array of pixels is slow enough to require three separate light modulators, one for each of three colors, such as red, green, and blue. A projection system like this has a number of drawbacks. One is that the incoming illumination beam must be linearly well polarized. In most projectors, where the lamp is unpolarized, approximately half of the light flux is lost and total brightness of the projector is diminished. A few projector designs can use all the polarization of the light, but this requires costly optics and a complex setup.

Another problem with typical projectors is that each pixel is distinct in its cell of an array. This leads to a "screen door" effect in the resulting image with noticeable borders between the pixels. Although recent designs have improved upon this problem greatly, the effect can still be easily seen in the final image. One other problem is the general requirement for three SLM panels. Not only does this greatly add to the total cost of the projector, but it also complicates the optical setup and requires precision alignment and recurring adjustments to keep the three colors perfectly aligned with one another. Ultimately the materials involved may also limit brightness from the projector. Additionally, over time, the liquid crystal molecules can break down under the high intensity of the projection lamps used, causing brightness and contrast to degrade over the life of the projector.

Several types of reflective SLMs have been developed to overcome these difficulties. One such type of SLM employs Liquid Crystal on Silicon (LCoS), a technique that uses similar technology to transmissive LCD displays except that the transmissive liquid crystal medium is laid over a metallic substrate and operated in a reflective mode. This technology also suffers the same burdens of requiring the incident light to be polarized and potential breakdown of the molecular structure of the liquid crystal materials.

A solution that has been quite successful in the last few years is the Texas Instruments DMD™. The DMD™ is an array of digital bistable mirrors that can be turned "on" to reflect the light to be imaged through a projection lens, or turned "off", to direct the light away from the lens. One limitation of this technology is that it can only modulate the light beam along one axis, usually in a digital bistable fashion. Accordingly, there must only be a single input beam of light coming from a single direction. Although various shades of gray are available through pulse width modulation (PWM) of the mirror, this is fundamentally a monochromatic process that would require additional equipment if color projection were to be achieved.

For high-end systems, a three-modulator system is used. FIG. 1 is a top view of a portion of a conventional three-reflective-panel projection system (specifically, a 3-DMD™ projector 100) including the prism assembly for color separation. An incoming light beam 102 from a very intense projector lamp can be split into three colors in a variety of ways; in the most common case, a prism assembly 104 is used to separate the red, green, and blue components to one of three separate micromirror arrays (106, 108, 110). Each colored beam is modulated appropriately and the three images are then combined as they exit the prism assembly into projection lens 112. A system such as this can exhibit extremely good color fidelity in its output. Because modulation speed of a digital micromirror is normally much faster than an equivalent LCD panel, a very high number of different colors can be produced at each pixel. In addition, this type of projector is very efficient in its use of the lamp intensity. Because much of the lamp's color spectrum can be used for each frame, the projector is brighter at a given lamp power than other similar technologies.

Such a system has a number of drawbacks, however. One is greater complexity. Similar to a 3-LCD projector, the 3-DMD™ projector must be precisely aligned and maintained to ensure that all of its imaged pixels overlap properly. Because the system modulates each signal very quickly, the electronics between each DMD™ panel must be synchronized with sophisticated electronics. Furthermore, the cost of an individual DMD™ chip is more than that of a corresponding LCD panel. All of this leads to an extremely expensive projector. Most of these have been used in cinema projection, as cost has so far been prohibitive for use in home or business.

Thus, the majority of projectors using a reflective SLM sold have been ones with only a single modulator. The DMD™ can be modulated quick enough so that a single mirror array can modulate several different beams of color. Color separation and production is a crucial yet is one of the most challenging areas for single panel reflective modulators. In order for a single panel to produce a full color image, the various color portions of the image share the mirror array either in time, space, or both. The most commonly used approach is time-sharing using a rotating color wheel. This common type of projector is illustrated in FIG. 2A. In this projector 114, an incoming light beam 102 from projector lamp 115 is focused through a rotating color wheel 116. The color wheel is composed of a plurality of different colored filters. Each segment may be repeated around the wheel, and there may be segments where no filtering of the light occurs. For simplicity, a simple color wheel with only three equal segments is shown, one each for red 118, green 120, and blue 122, a close up of which can be seen in FIG. 2B. After the color wheel, the beam is normally directed into an integrator rod 124, which is either a hollow tube with interior reflecting surfaces or a solid glass rod that uses total internal reflection to keep the beam within it. The intensity profile of most projector lamps is nonuniform; multiple reflections inside the integrator rod homogenize these variations. The shape of the exit port of the integrator is chosen to match with the shape of the SLM for maximal use of the light. The light is then focused onto the single panel modulator 126 which may be a DMD™ or some other type of SLM, and is then imaged by the projection lens 112.

Generally, the color wheel is spun at a high rate of speed to allow for high frame rates in the video image. As the red portion 118 of the color wheel intercepts the beam, the SLM modulates the appropriate intensity for the red component of each pixel. A similar procedure is repeated for the green portion 120 and the blue portion 122 of the color wheel. To achieve even a minimum 30 frames per second, this color wheel is spun to at least 1800 RPM. However, at this speed range, quality of the image may be degraded. Many people can see a distracting "rainbow" effect, particularly when colored images are portrayed in motion. This effect can be ameliorated by either increasing the number of colored segments around the wheel, increasing the rotation speed of the wheel, or both.

While these measures make the color transitions appear smoother, they also require a complicated feedback mechanism to synchronize the color wheel position with the light modulation timing electronics. At the transition between different colors of filter, there is an area called the "spoke" where the beam intersects both colors of the filter. This portion cannot be used easily without introducing visual artifacts in the image. Although some attempts have been made to use the "spoke" region to obtain brighter secondary colors, it is difficult to completely remove the artifacts, and this technique desaturates the colors. At increased rate of transition of the spokes, effectively less light from the lamp is used for the image resulting in dimmer displays.

One improvement that has been made by Texas Instruments to projectors using color wheels is by using Sequential Color Recapture (SCR). In a system using SCR, the color wheel of FIG. 2B is replaced by a spiral-pattern wheel of closely spaced dichroic filters shown in FIG. 2C. FIG. 2C shows the bands as being spaced farther apart than in an actual device for clarity of illustration. As this color wheel 128 rotates, several different colored bands impinge on the SLM surface at the same time and scroll smoothly across it in a linear fashion due to the shape of the spirals. At each filter section of the color wheel, a portion of the light not passed by that section is reflected back into the integrator rod and subsequently back toward the SLM through its correctly colored filter section. This can lead to an appreciably greater light throughput for a given lamp intensity versus a simple color wheel approach. In addition, as the color segments are spaced very closely together, the "rainbow" effect in the resulting image is lessened.

Though this spiral-patterned wheel works well in practice, it requires highly sophisticated techniques to synchronize the slightly curved colored bands on the surface with the control electronics of the SLM. As with a standard color wheel, some of the extra brightness gained using this technique must be sacrificed to prevent the mixing of light from adjacent bands.

There are a number of other designs that have been made to achieve proper color separation for a similar SLM that share the color in a spatial manner. One design includes the use of dichroic beamsplitters to separate a beam into three component colors. These separated beams are directed through a rotating prism that projects the three colors into scrolling bands on the SLM surface. Another method involves a technique wherein three separated color beams are reflected by a rotating polygonal mirror where the colored bands that similarly scroll over the SLM surface. In both of these techniques, most of the intensity of each of the three colors are concentrated within its own band. Thus, a projector using this illumination technique could potentially be very efficient in its use of the lamp power. One drawback of these techniques is that the color bands formed do not remain spatially uniform as they scan over the SLM surface, but change size. Precision synchronization of the SLM to the moving and changing color bands can be extremely difficult. Both of these techniques may also cause more artifacts in the resulting image than with a color wheel system, as the rotation rate of a prism or mirror cannot be as fast as the wheel.

Another approach uses color bands that do not move on the SLM surface but change colors. This approach may include the use of two rotating dichroic beam splitters arranged as color wheels that appear similar to FIG. 2B. The wheels are mounted to the same rotating shaft and are offset by 120°. In each case, three beams are created, one each of red, green, and blue. Over one revolution of the wheel, each of the single beams switches through all three colors in such as way that red, green, and blue are always present in one of the beams. The three beams may be directed into three parallel integrator rods that are output adjacent to each other. The ends of the three integrator rods are then precisely focused onto the SLM surface. Although greater power can be obtained from this arrangement, this is optically very complex. Diverging light from the end of each integrator must be very accurately directed onto the SLM into a precise region separate from the next region. If the beam overlaps onto the adjoining region, there will be a visibly apparent bright line at the interface. If too great a gap is left between the regions, the dark gap will also be noticeable in the projected image.

In an alternative, the three variable colored beams are separated, put through separate integrator rods, and directed onto three separate regions of the SLM. Each region of the MEMS device is constructed so that its axis of rotation is different from that of the adjacent region. The various beams are aimed at the surface such that the "on" state for its region will point the light hitting that region toward the projection lens. Precise alignment is not as important for this arrangement, since overlapping light onto the next region will be reflected away from the projection lens whether the micromirrors in that region are set "on" or "off," although overlap among the various regions is minimized to increase to total light intensity of the projected image.

Various improvements to micromirror display technology have been proposed, an example of which is depicted in FIG. 3A and FIG. 3B. FIG. 3B shows the micromirror of FIG. 3A without the mirror. In this example, the micromirror is supported not at its center, but along the corners of the mirror. This innovation decreases the amount of light scattering as compared to the DMD™ and strives to achieve higher contrast ratios. This method of support also allows the mirror size to be more readily decreased. Not only does this improve the resolution and pixel count of the mirror array, but it also allows the mirrors to tilt at steeper angle, further improving the contrast of such a projector. Nevertheless, this is still a bistable mirror. Thus, for a single panel system, some mechanical color separation technique such as a color wheel or others may remain necessary.

One common factor in all of these approaches is the requirement for rapidly moving mechanical parts to achieve color separation. These moving parts add complexity to the projector, requiring precise synchronization of the mechanical color separation system with the SLM electronics, while also exhibiting noise and reliability issues. Although heat buildup in projectors using high-intensity lamps requires the use of noisy cooling fans, motors to run the color separation element or elements add an appreciable amount of noise to the system themselves. Especially in the consumer market, a quieter system will always be preferable. In addition, these mechanical parts must always run during the use of the projector and be controlled very accurately. This reliance is problematic if the parts have a tendency to break down, or degrade in performance. Designing a projector to ensure reliability in this area increases costs. As such, there exists a need for a device that addresses the various deficiencies of the noted technologies.

SUMMARY OF THE INVENTION

In one aspect, the invention is a micromirror device that includes an imaging lens assembly and an array of micromirrors. Each of the micromirrors simultaneously receives a plurality of light beams. The position of a micromirror in the array of micromirrors is adjustable such that the micromirror selects one of the plurality of light beams to direct toward the imaging lens assembly.

In yet another aspect, the invention is a method of displaying an image. The method entails simultaneously directing a plurality of light beams onto an array of micromirrors and individually controlling a position of each of the micromirrors such that each of the micromirrors selectively reflects one of the light beams toward an imaging lens assembly.

The invention also includes a display device that incorporates any of the above micromirror devices.

In yet another aspect, the invention is a micromirror device comprising an imaging lens assembly, a micromirror array optically coupled to the imaging lens assembly, and a TIR prism assembly optically coupled to the micromirror array. The micromirror array includes a plurality of micromirrors that simultaneous receive a plurality of light beams and directs one of the plurality of light beams toward the imaging lens assembly. The light beams traveling to the micromirror array and reflected light beams leaving the micromirror array pass through the TIR prism assembly.

BRIEF DESCRIPTION OF THE DRAWINGS

FIG. 7A is a perspective view of the mirror seen in FIG. 6A with three exemplary input beams.

FIG. 7B is a top view of FIG. 7A.

FIGS. 7C–F each show the mirror of FIG. 7A in one of four states.

Figure 1:
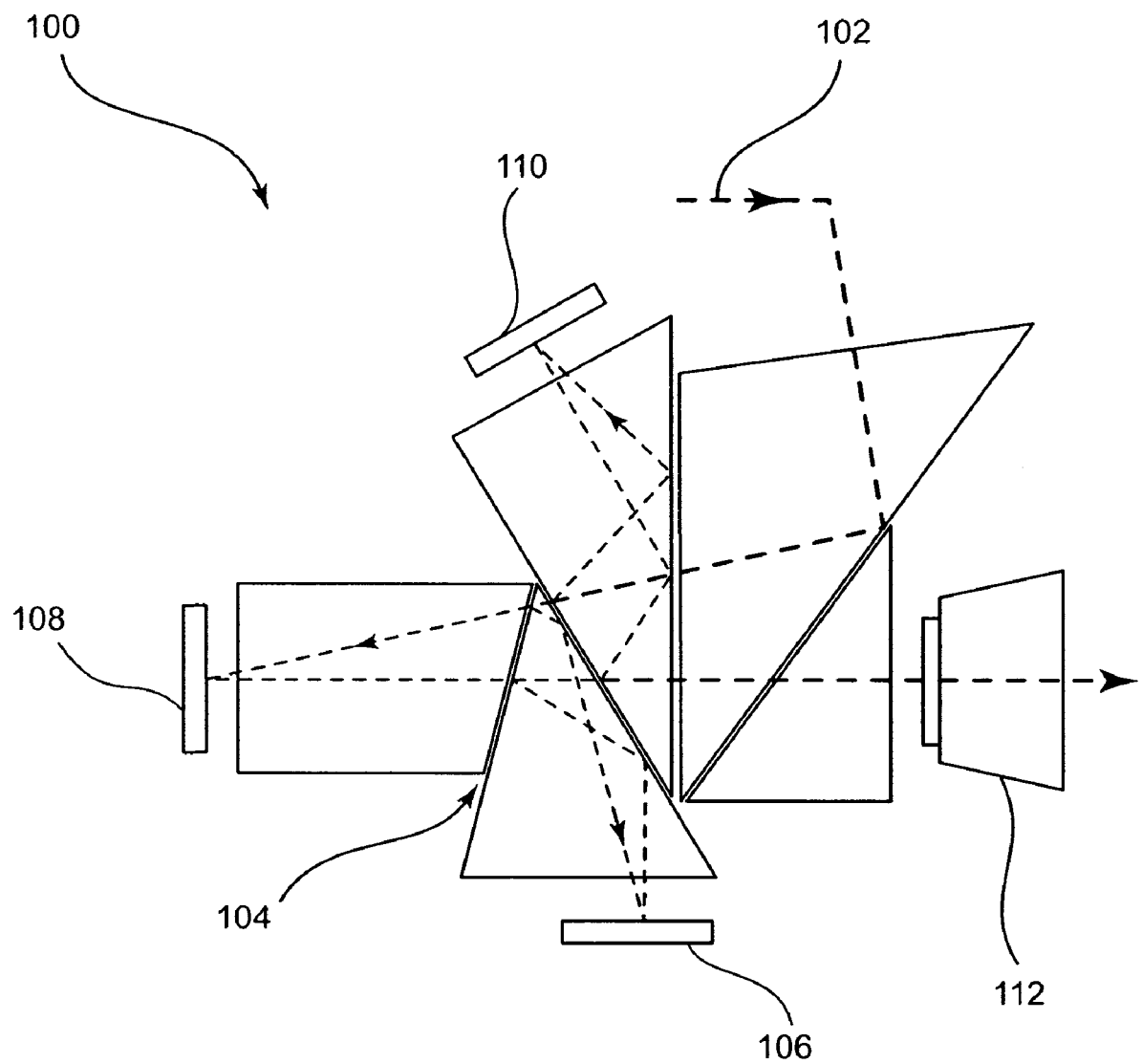
FIG. 1 is a top view of a portion of a conventional three-reflective-panel projection system including the prism assembly for color separation.

Variation of the invention from that shown in the figures is contemplated. The figures and following detailed description are provided merely for illustrative purposes of selected non-limiting examples of the present invention. This subject matter is not to be taken in a limiting sense, but is made merely for the purpose of explaining certain general principles of the inventions.

DETAILED DESCRIPTION OF THE INVENTION

Before aspects of present invention are described in detail, it is to be understood that the invention is not limited to particular variations set forth and may, of course, vary. Various changes may be made to the invention described and equivalents may be substituted (both presently known and future-developed) without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Reference to a singular item includes the possibility that there are plural of the same items present. More specifically, as used herein and in the appended claims, the antecedent "a" is intended to mean "at least one" unless the context clearly dictates otherwise. Unless defined otherwise herein, all technical and scientific terms used herein have the same meaning as commonly understood by one of ordinary skill in the art to which this invention belongs.

"Imaging," as used herein, includes not only applications where light is received from an outside source and sensed by or recorded on a part of a device but also applications where light is projected from inside a device. For example, the present invention includes a color projector display system that can accomplish color separation and projection with few or no moving parts apart from the micromirror array and reduced complexity electronics. A projector according to the present invention most often includes a lamp with condenser optics, dichroic beam splitters to separate the colors, one or several integrator rods to homogenize the beam, mirrors or lenses to focus the beams on the mirror array, a multi-axis mirror array to modulate the light, and a projection lens assembly to project the image.

Individual mirrors in the micromirror array are able to tilt in more than one axis to direct various input beams. Separated color beams, e.g. three beams, are directed onto the SLM, each at substantially different angles. In the three-beam case, a micromirror acting as a pixel may tilt in one of four directions, three of which aim their corresponding input beam toward the projection lens, and the fourth state such that the mirror may be tilted to an "off" position, where none of the colors are projected at that pixel. In this fashion, a full gamut of colors may be projected with only passive color separation. Micromirror response is very fast; since each mirror may be quickly cycled through the various colors, color modulation can be done at rates much faster, on the order of tens of kHz, than could be accomplished with a color wheel, which cycles at about one kHz respectively, thereby eliminating many visible artifacts such as the "rainbow" effect.

In one aspect of the invention, because each light component always impinges upon the SLM, other types of color correction can be made. In most projectors using a single panel, mercury halide, mercury vapor, or xenon lamps are used as the light source. They are used primarily because of their high efficiency and relatively lower costs, but have unevenness in their spectra. By giving time-wise preference to dimmer colors, color imbalances can be easily corrected, again at fast enough speeds to eliminate many artifacts. This method may also be used to increase the brightness of saturated colors without lowering the brightness of projected white light, thereby increasing the usable color space.

Figure 4A:
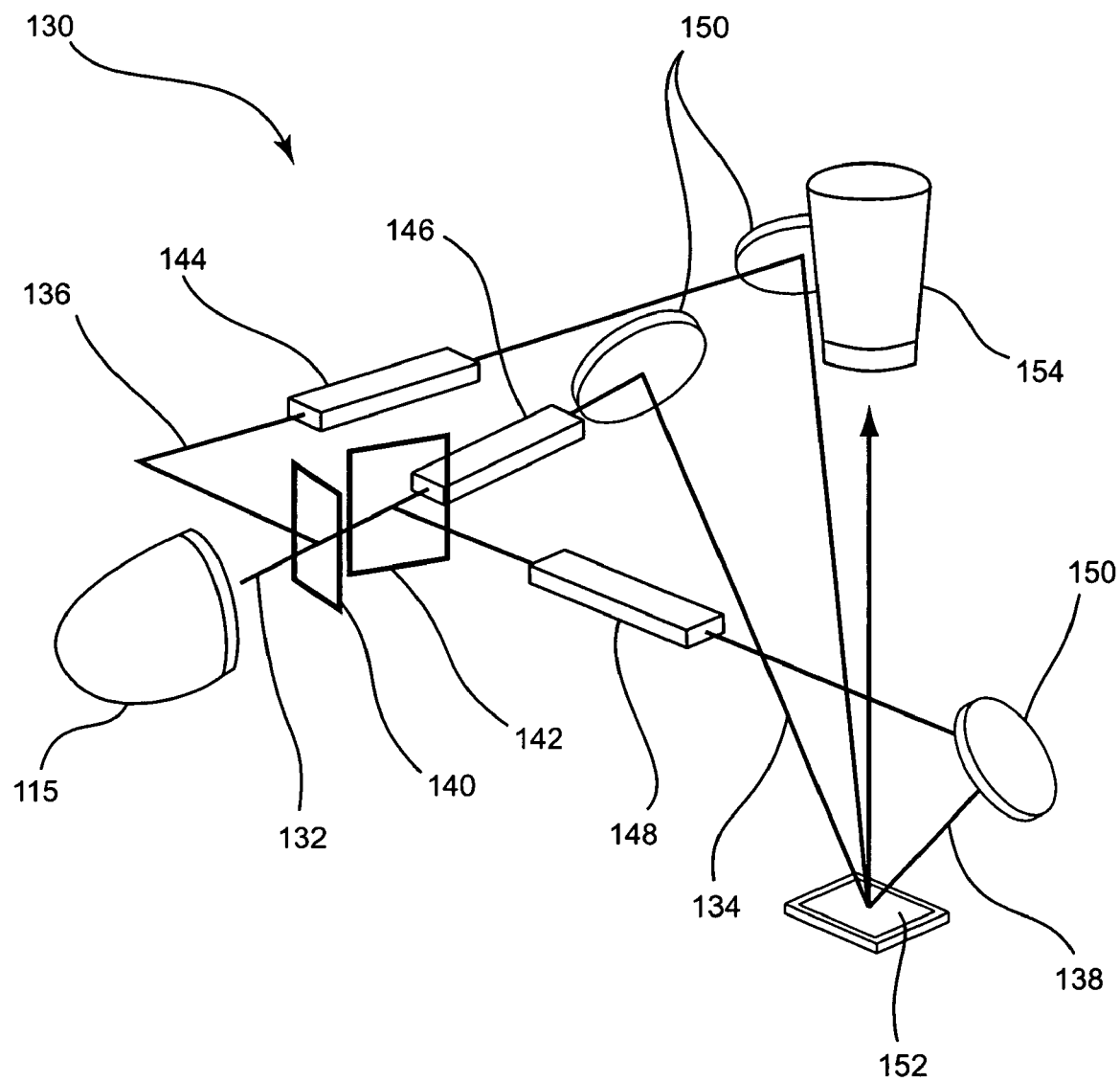
FIG. 4A is a perspective view showing an embodiment of the micromirror device in accordance with the invention.

FIG. 4A shows an exemplary projector 130 according to the present invention. In this embodiment, an incoming light beam 132 from projector lamp 115 is split into a red 134, green 136, and blue 138 component by a pair of dichroic beam splitters (140, 142). Of course, other methods could be used to separate the light into its several components, such as color beam splitting prisms or other methods well known to those with skill in the art. All light components are represented here as direction vectors, although in reality they will generally be diverging or converging cones of light. The components are each directed into their own integrator rod (144, 146, 148) for homogenization of the beam profile. In this embodiment, each beam is shown using a separate integrator rod, although to save on space and cost it may be preferable to have only a single rod for all three colors placed before the first beam splitter 140. The three beams are directed onto the SLM with focusing optics 150, here portrayed as a single mirror, although this section could alternatively be composed of one or several lenses, and could also include none or several mirrors.

The purpose of the focusing optics subsection is to match the shape of the beam from the integrator rod with the SLM, and also to bring the light in at a specified angle. Each of the three beams (134, 136, 138) impinges upon the SLM surface 152 at substantially different angles from the other two but is shaped such that the beam covers the entire surface. Thus, all three color beams impinge upon every mirror in the array simultaneously with no time division. Because the color separation uses only passive optics, mechanical solutions for color separation can be avoided. Light to be projected is reflected normal to the surface of the SLM toward the projection lens assembly 154. Because the micromirrors in the array are capable of tilting in multiple axes, each mirror may be set at an angle so that any one of the three input beams is reflected out the projection lens to create an "on" pixel for that color.

A number of other variants to the projector shown in FIG. 4A are also possible. In most current projectors, various styles of arc lamp are used as the light source owing to their reasonable cost, high brightness, and good power efficiency. Two other ways of lighting have been proposed and tested. One is using lasers as the light source. Lasers tend to have a very narrow bandwidth, suitable for reproducing a large color gamut, and are very intense. Although these are significant advantages, so far the high cost and high power requirements for visible lasers have largely kept them out of the market.

Figure 4B:
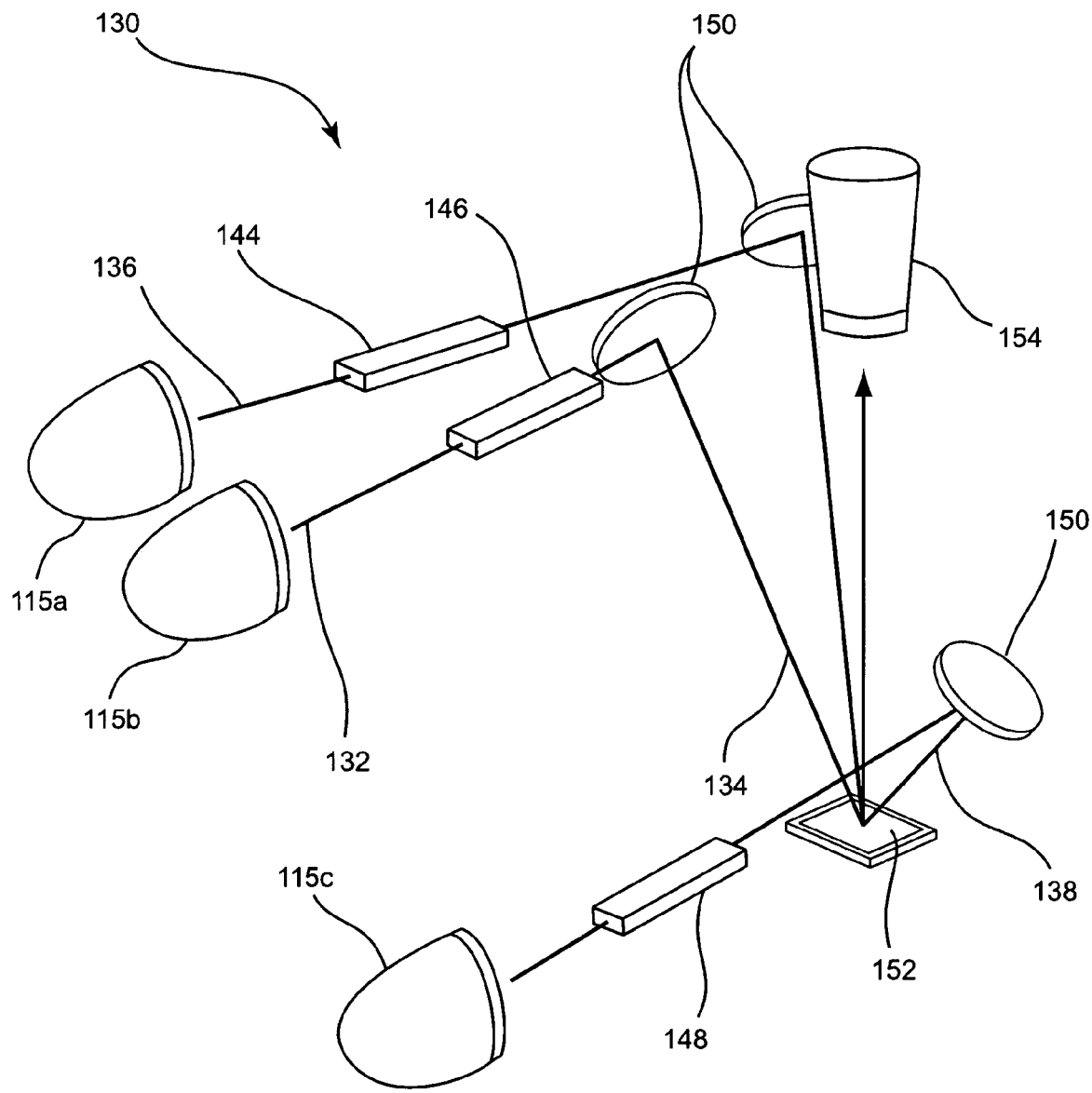
FIG. 4B is a perspective view showing an alternative embodiment of the micromirror device in accordance with the invention.

FIG. 4B shows an alternative projector 130 including three separate light sources 115a, 115b, 115c instead of the single projector lamp 115. Each of the light sources 115a, 115b, and 115c may be a set of LEDs for a color. These have the advantage of extremely good power efficiency, but so far overall brightness is not nearly as high as other light sources. As the technology improves, the embodiment of FIG. 4B may become more widely used. The technique of using multiple light sources may be used with more conventional types of light sources such as lamps, although it will have fewer benefits if the lamp does not heavily focus most of its power into a portion of the spectrum; otherwise too much power would be lost and there would be no efficiency gain over using a single lamp.

The projector of the present invention is extremely well suited for these alternate forms of illumination, as the colors are already well separated and there is no need for dichroic beam splitters or other similar methods. The individual light sources can be directly focused onto the spatial light modulator in the appropriate direction.

Although three beams are illustrated in these embodiments, this is in no way limiting. Two, four, or more beams may be directed toward the micromirror array. Due to the multi-axis movement of the mirrors, each incoming beam can be individually modulated. These modifications may lead to a projector with an increase in either total brightness, color gamut range, or both.

Figure 5A:
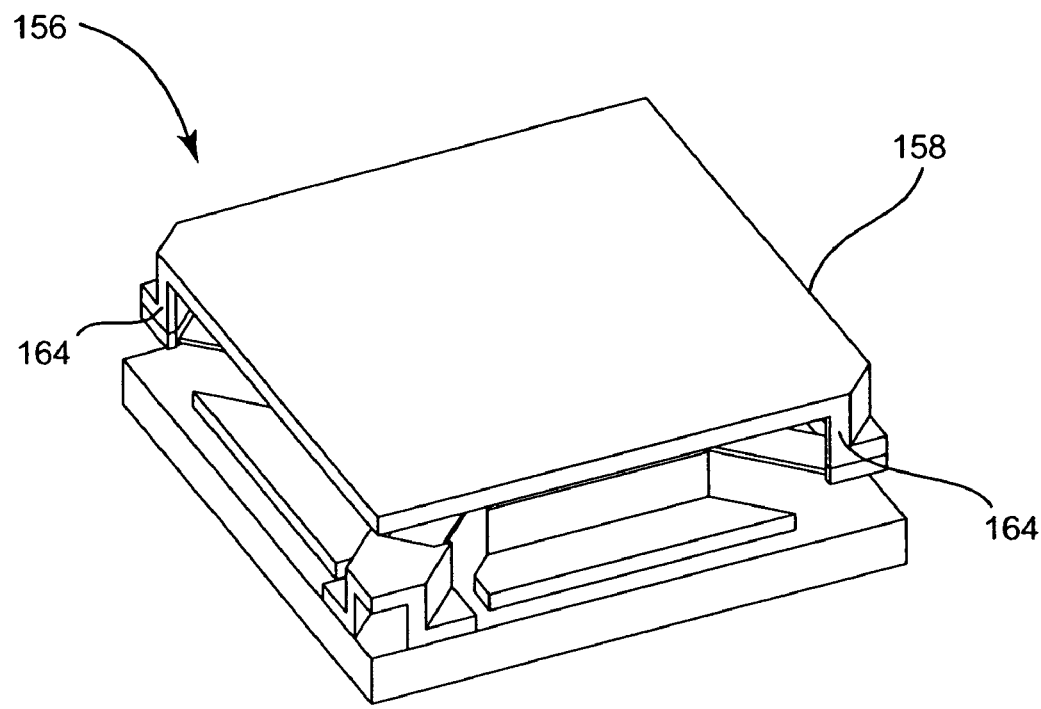
FIG. 5A and FIG. 5B are perspective views of a multi-axis mirror suitable for use in the projector of FIG. 4A, with and without the mirror top, respectively.

FIG. 5A displays a multi-axis micromirror 156 suitable for use in the present invention. Details on the construction and use of this micromirror, as well as a number of other variants usable for the present invention can be found in U.S. Pat. Nos. 6,900,922 and 6,906,848, both of which are incorporated herein by reference in their entirety.

Figure 5B:
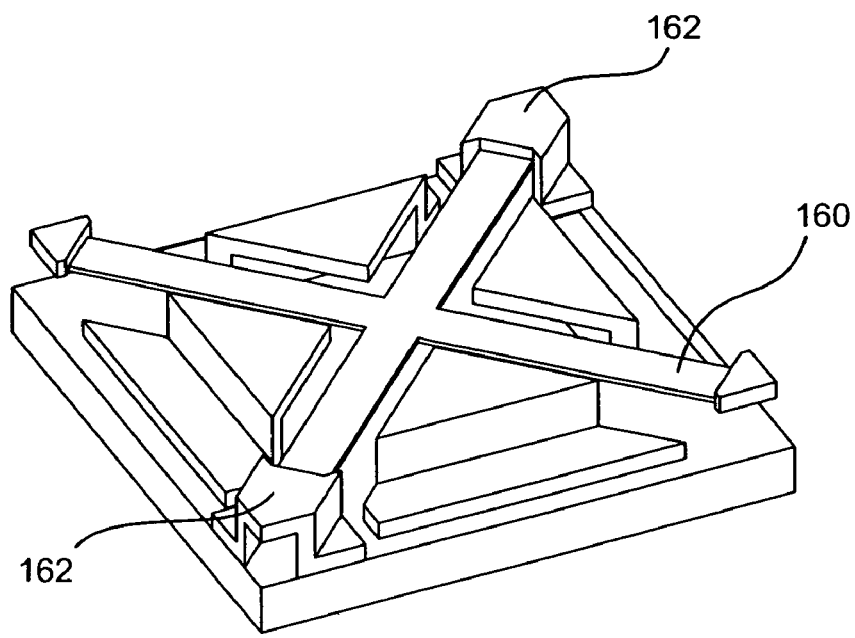

For explanatory purposes, the utility of one of these micromirror designs in the present invention is summarized. FIG. 5B shows the same micromirror structure with the mirror 158 removed. In this design, the cross-shaped hinge 160 is connected at two opposing ends to base supports 162 and at the other two opposing ends to mirror supports 164. This arrangement permits torsional rotation of the mirror around the two axes of the hinge directions and effectively allows the mirror to freely tilt in any direction at an angle between, but not limited to, 10–20° depending on the dimensions of the mirror. Within the addressability of the electrodes, the angle of this mirror may be set in a continuous fashion as the micromirror as pictured has not stopping mechanisms to constrain the movement. For this example (with three separate input beams), only four distinct positions are needed for the mirror: three for each of the input beams, and one as an "off" position. A mirror with four distinct positions might be called a quadstable mirror. Without any modifications, this design could work well if the stable points selected are in the direction perpendicular to the sides of the mirror. The four quadstable points would be tilting in a direction substantially 45° from the axis of either of the torsion hinge sections.

Yet, it may be preferable to use an alternate mirror design 166 as pictured in FIGS. 6A and 6B, where once again FIG. 6B shows the micromirror of FIG. 6A with the mirror surface 168 removed. The underlying cross-shaped hinge 170 is very similar to the one seen in FIG. 5B and works in the same manner. The main difference is that the supports are now located substantially in the center of the side of the mirror. The four desired stable points will be located toward the corners of the mirror, again at substantially 45° from the axes of the hinge sections. This design offers some advantages over the previous design.

By locating the supports at the side, more space is created in the corners of the mirror, and a slightly higher tilt angle can be achieved. A higher tilt angle generally results in greater contrast of the resulting image, as "on" and "off" beams are better separated. In addition, the extra space may be used to provide mirror stops to precisely control the final tilt angle of the mirror so that all mirrors in the array behave consistently, although for simplicity, these are not included in this figure. Several posts located near the corners may be sufficient to act as mirror stops, although it is to be understood that this case is not limiting; many other techniques for this purpose are well known to those with skill in the art. Using this type of mirror stop also simplifies control of the mirror, as precision setting of the electrode voltage to electrostatically attract the mirror is unnecessary.

An aspect of the invention lies in the use of a multi-axis mirror to direct the various beams through the projector lens. FIG. 7A shows a typical layout of incoming beams with a single micromirror as pictured in FIG. 6A. This micromirror is shown untilted in a flat position, parallel to its base, although when in use the mirror will always be actuated toward one of four tilted positions. For this picture, a coordinate system is chosen such that the X and Y axes are collinear with the diagonals of the mirror surface, and therefore the Z axis is normal to the mirror surface 168 and coincident with the direction of propagation of a projected light beam. In the current embodiment, the red 134, green 136, and blue 138 components are each represented by a single vector, here shown with guidelines to indicate the plane in which they lie. Each of the components hits the mirror at the same angle α with respect to the normal of the flat mirror but in a different direction. The angle α is determined by the maximum tilt of the mirror. In order for the light to reflect directly normal to the SLM substrate, the maximum tilt is α/2.

To achieve the best contrast in the image, the input beams should be separated as far as possible. FIG. 7B displays a top view of FIG. 7A. The projection of the vectors representing the red, green, and blue components onto the plane of a flat mirror will appear to be separated by angles β. The α, β angles described here could also be construed as describing a spherical-polar coordinate system for the beam vectors. In this embodiment, angle $\beta_1$ between the red beam 134, and the green beam 136 is set at 90°, similarly that for angle $\beta_2$ between green beam 136 and blue beam 138.

Figure 7E:
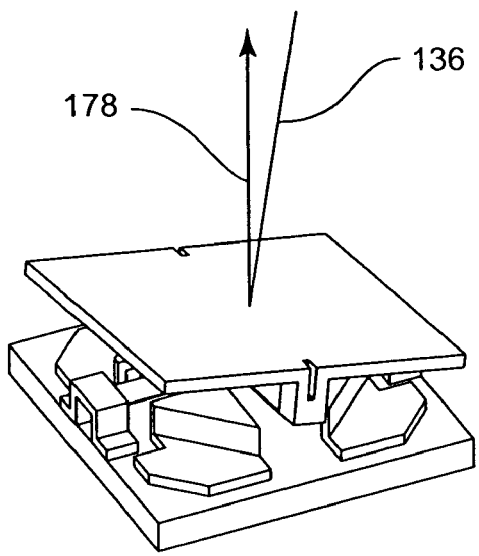
Figure 7F:
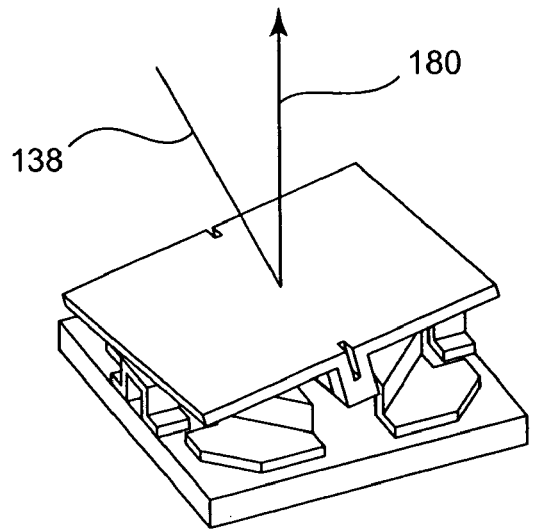

Although other direction angles are possible, this orientation may be preferable. The angle between the red beam 134 and the nominal "off" direction 174 $\beta_3$ is the same as the angle $\beta_4$ between the "off" direction and the blue beam 138, so that $\beta_3=\beta_4=90°$. This is primarily to achieve the best color separation and contrast. FIGS. 7C–F shows the mirror of FIG. 7A in each of its four quadstable positions. FIG. 7C shows the mirror tilted away from all three of the input beams in its "off" position. In this position, all of the input beams still hit the mirror, but are deflected (along three separate vectors) away from the projection direction. Red output beam 176, green output beam 178, and blue output beam 180 are deflected so that none are output to the image. In FIG. 7D, the mirror 168 is tilted toward the red input beam 134, with red output beam 176 being projected on the screen at that pixel. Green beam 136 and blue beam 138 are not shown in this state, but are deflected away from the projection direction in much the same manner as seen in FIG. 7C, although in yet a different direction than in that figure. FIGS. 7E and 7F are similar to 7D, but show the "on" states for the green beam 136 and the blue beam 138 respectively.

Hereinafter for this embodiment, these positions will be referred to as the "red," "green", "blue," or "off" states of the mirror. Returning to FIG. 7B, the reason for the preference of 90° for each β should be apparent. A β angle of 180° between "on" and "off" states would give maximum separation of the two beams; this is in fact the scheme used in a projector such as one shown in FIG. 2A, where a bistable mirror DMD™ is used for the SLM. As the angle β is lessened, progressively less separation in the output of the resulting beams can be accomplished. So, maximum separation of the beams is desirable. However, there should also be maximum separation between each of the beam angles and the tilt of the "off" direction. For three input beams, maximum separation for all these constraints exists when $\beta=90°$ for each β in a symmetrical distribution. For instance, for best color fidelity, although when the mirror is in the "off" state like in FIG. 7C, all three input beams must be aimed away from the projection lens, in the "red" state, only the red beam 134 should be projected; for the green beam 136 and blue beam 138, the "red" state of the mirror needs to act as an "off" state for both green and blue while remaining "on" for red. Similar considerations apply for the "green" and "blue" states of the mirror.

Figure 6A:
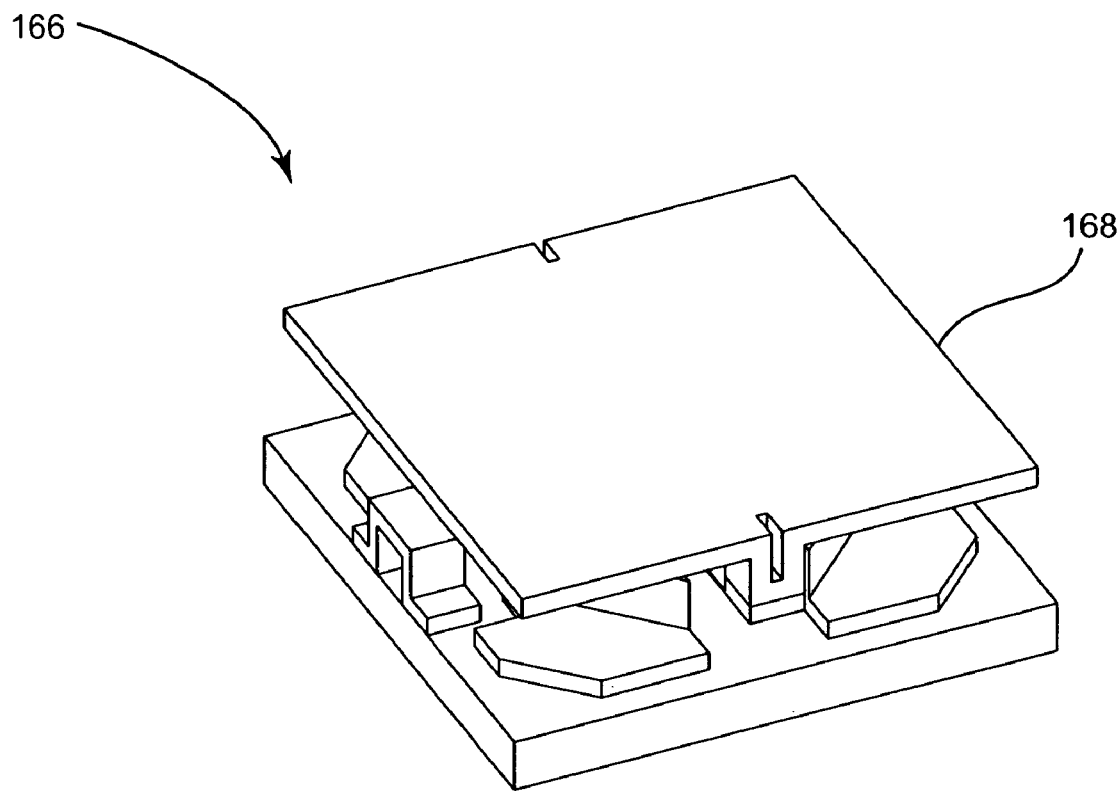
FIG. 6A and FIG. 6B are perspective views of an alternate layout for a multi-axis mirror, with and without the mirror top, respectively.
Figure 6B:
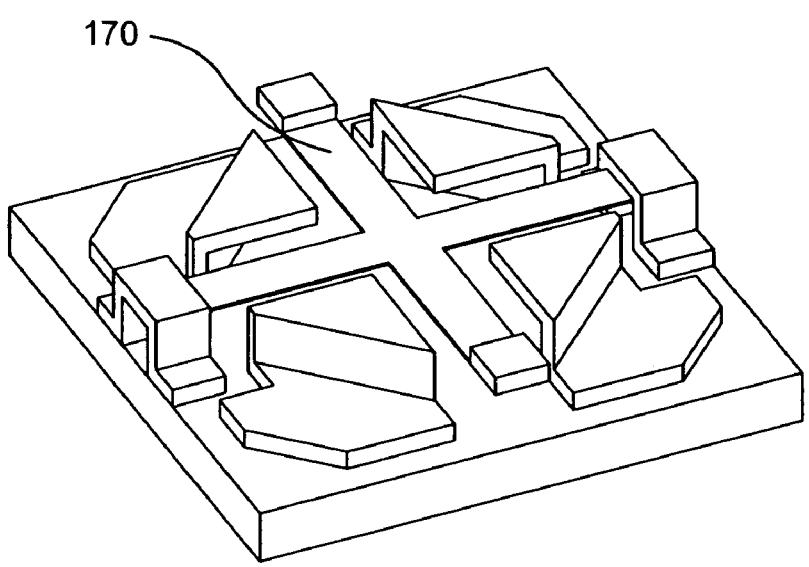

Nevertheless, there may yet be configurations where it is preferable for all angles β to not be equal, such that $\beta_1$ and $\beta_2$ are substantially less than 90°, and $\beta_3$ and $\beta_4$ are substantially greater than 90°. Because the hinges of this mirror allow tilt of the mirror in virtually any direction, the only modification needed from the design shown in FIG. 6B would be a change in the way the mirror stops were laid out, forcing the quadstable points to be at the angles desired. The major reason for such an arrangement would be to increase contrast of the "off" state of a pixel. For example, if $\beta_1$ and $\beta_2$ were reduced to 60°, separation of red from green, or green from blue would become slightly more difficult as the resultant output beams (176, 178, 180) would be closer together, but would still be necessary to obtain saturated primary colors. Even if the contrast between the beams were somewhat poor in an objective sense (such as 200:1 ratio of red to green in the "red" state of the mirror) the effect of the small amount of added green would be almost unnoticeable. Contrast differences between any "on" state and a black "off" pixel are very noticeable, and it is generally this measurement that defines the overall contrast of the system. This configuration can be seen in FIG. 7G. Although for use in this way the mirror as seen in FIG. 6A could be easily modified, it may be simpler to use a mirror with a different shape, such as hexagonal, but with substantially the same hinge and other underlying structures. In this example, $\beta_3$ and $\beta_4$ are increased to 120°. Per the previous discussion, increase of these angles will improve the separation between the "off" state and both the "red" and "blue" states. Contrast should improve as a result. Note, however, that the stated beam angles are only exemplary.

Figure 7G:
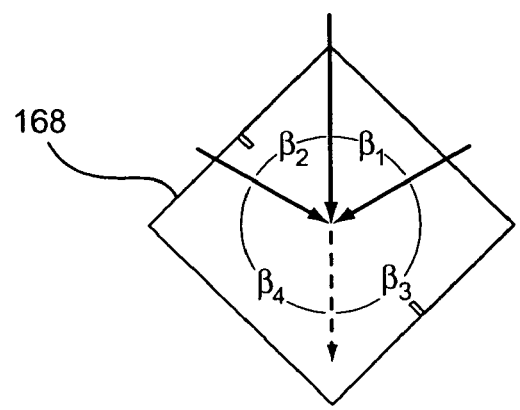
FIG. 7G is a top view of FIG. 7A showing the input beams in a different configuration.

The configuration as pictured in FIG. 7G may have additional advantages. If the input beams are positioned far enough apart in angle so that the individual beams can be readily separated to project a pure primary color at a given pixel, good color fidelity will still be preserved. The beams in this configuration may also be close enough so that there exists an "intermediate" state of the mirror where a substantial portion of the power of two adjacent input beams passes through the projection lens, creating a secondary saturated color. For example, a "cyan" state may be formed by the mirror tilting in the direction of the arrow 181 depicting the nominal intermediate direction of the mirror. By use of the extra "intermediate" states available, total brightness of the projected image may be markedly increased without any increase in the brightness of the lamp.

The micromirror device of the invention allows the colors to be cycled through more quickly than the conventional color wheel approach described above. For instance, while a color wheel is rotated so that a blue component of the light passes through, the bistable mirrors (or similar technology) are rapidly modulated using PWM to achieve a variety of brightness levels for that blue component. The other colors cannot be modulated until their section of the wheel is in the beam, and so the sequence for that increment of time would alternate between "blue" and "off". Because the color wheel is mechanical, even at increased speeds it is moving much slower than the response times of the electronics and the SLM. As has been mentioned, if the color wheel is too slow, a "rainbow" effect may be apparent in the resultant image, but if the wheel is moved faster, other artifacts may be introduced, as well as brightness lost because the transition or "spoke" regions between the various color filters in the wheel are partially or wholly unusable.

These problems do not exist in the present invention. Since all colors impinge on the multi-axis mirror array simultaneously, switching between the colors can be done extremely fast. The quadstable nature of the mirrors allows each mirror to select one color among all the impinging colors. For example, a single micromirror may have four possible states or positions: "red," "green," "blue," "off." The time spent at each position in the cycle would determine the relative brightness of each component at that pixel. A single cycle would be far faster than the equivalent red, green, blue cycle of a color wheel, nearly eliminating color artifacts. In addition, transition time between states of the mirrors is very fast as well, on the order of tens of microseconds, and so there is not brightness lost and no additional artifacts introduced because of "spoke" transitions between the colors. Another possible sequence for color addressing could be "red," "off," "green," "off," "blue," "off." This and many other variants may be apparent to those with skill in the art.

In a color wheel system, complex electronics are required to maintain synchronization between the color segment of the wheel and the modulator. These problems become more difficult when using an SCR or other similar system that simultaneously scrolls different color bands across the surface. Synchronization of the color bands with the proper modulation on the surface becomes quite complicated. The present invention eliminates the need for synchronization. With all three colors directed at all mirrors, the array can be addressed solely by the required video signal. In addition, each mirror can display different colors independently so that timing of addressing adjacent mirrors can be staggered. This may further simplify control electronics as well as giving smoother color transitions.

The style of micromirror as seen in FIGS. 5A and 6A is quite well suited for projection applications. The hidden hinge design allows maximal space on the surface of the SLM to be used for reflection of the projected light. High active area and small gap sizes between mirrors gives a very high fill factor to minimize the "screen door" effect. Minimization of large open spaces containing the supports for the micromirror also lowers the light scattered and thus improves the contrast. This micromirror was chosen because it exhibits a number of advantages for projection displays over many other technologies. However, the present invention is in no way restricted to this particular style of SLM. Other designs of micromirror, providing that they are capable of tilting in at least two axes could also be suitable for use in the present invention. The SLM need not be restricted to MEMS micromirror technology. It can be conceived that a multi-axis LCoS or other kind of reflective pixel array may be used as the SLM in the present invention. Although the incoming and outgoing angles would change from the reflective case, it may also be possible that a transmissive multi-axis SLM may be used.

The projector 130 of FIGS. 4A and 4B presumes a certain amount of distance between the SLM and the projector lens. The reason for this presumption is that there is sufficient clearance to allow separation of the projected beam from light that is deflected into the "off" direction. Also, there is sufficient space to shine the illumination beam onto the array. The "off" beam is generally directed to an absorbing surface inside the projector. The need for a certain amount of space sometimes interferes with the goal of making the device more compact.

Figure 8A:
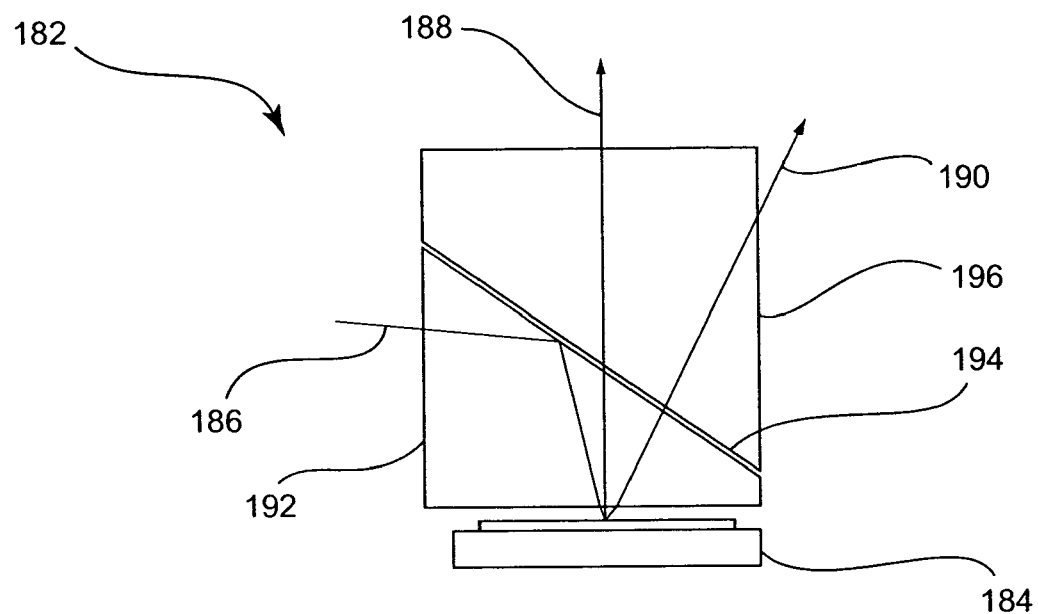
FIG. 8A is a side view of a conventional two-prism total internal reflection prism assembly.

In some designs, total internal reflection (TIR) prisms are used to create a more compact and higher contrast projector. FIG. 8A is a side view of a simple TIR prism setup 182 used in a conventional projector. The prism assembly is disposed directly over the SLM 184. Incoming beam 186 enters lower prism 192, reflects off small air gap interface 194 onto the SLM surface at the appropriate angle. The "on" beam 188 and the "off" beam 190 transmit past interface 194 and through upper prism 196. In this setup, the two outgoing beams must still be separated in space, but the projector can be made extremely compact.

Figure 8B:
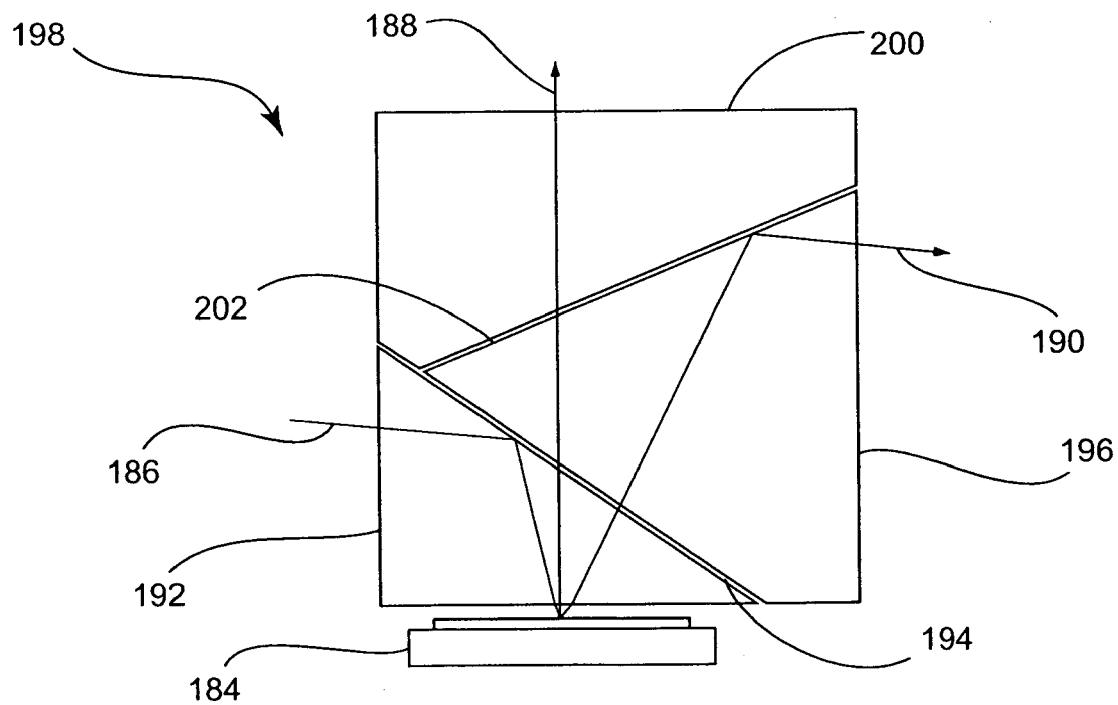
FIG. 8B is a side view of a conventional three-prism total internal reflection prism assembly.

FIG. 8B displays another common TIR prism arrangement 198, wherein a third prism 200 is added to the configuration of FIG. 8A. This setup works very similarly to the previous prism arrangement, however at the second air gap interface 202 the "off" beam 190 is reflected off to the side whereas the "on" beam 188 is transmitted toward the projection lens. This configuration offers a number of advantages. The high angle of separation between "off" beam and the projection direction can increase the contrast over a system without TIR prisms. Also, specularly reflected light off flat portions of the mirror array are deflected away to the side, increasing the image contrast. In many cases, the prism 182 is chosen over prism 198 because the space requirements are lower.

Although other modes are possible, the most common is that the projected beam passes through all the prism interfaces whereas the illumination beam and the "off" state beam are internally reflected. The multiple beams of the present invention make this task much more complex, as even for this embodiment of a simple three input beam system, a prism assembly will be designed to accommodate three input beam, one output beam, and nine "off" state beams, each pointing in a generally different direction. A prism system for a projector with four or more input beams might be considerably more complicated.

Figure 9A:
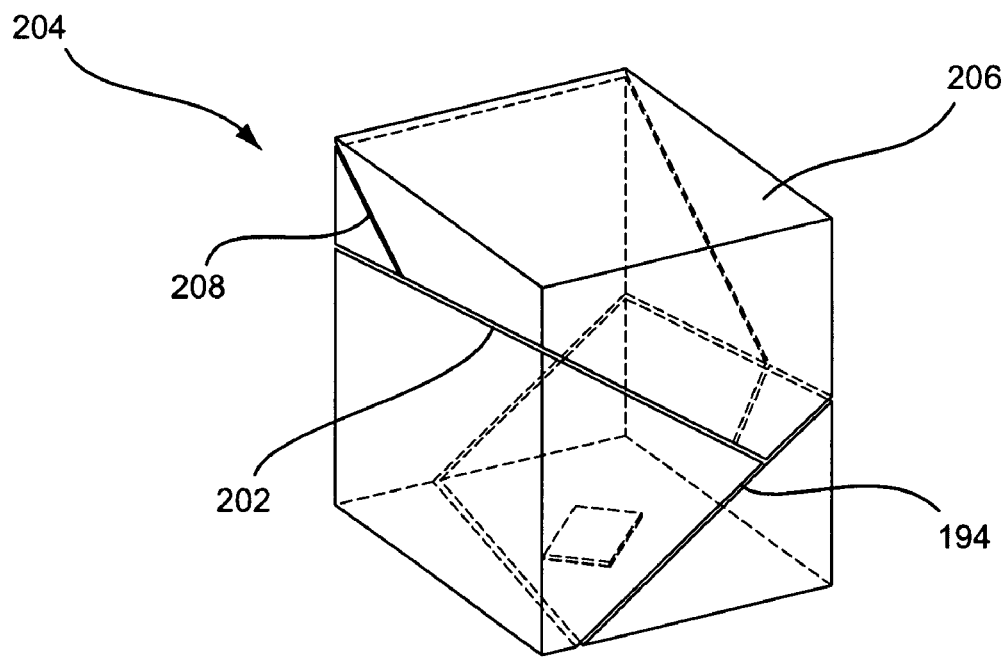
FIG. 9A is a perspective view of a prism assembly suitable for use in the present invention.

FIG. 9A shows a TIR prism assembly 204 suitable for use in the present invention. This particular setup is in no way limiting in the variety of possible TIR prism assemblies but is merely intended to illustrate that such a setup. In this assembly, four prisms are used. The three prism interfaces are reflected upon by multiple beams for both input and "off" state beams. In this case, there is a fourth prism 206 added to the assembly. The first interface 194 reflects in the red beam, the second interface 202 the blue beam, and the third interface 208 the green beam. Both the first and second interfaces deflect all nine "off" state beams away from the projection direction. In the α, β coordinate system described earlier, the angles of the normals of each prism interface plane to the substrate can be stated about as follows: for the first interface, α=36°, β=10°, for the second interface, α=36°, β=170°, and for the third interface, α=36°, β=270°.

Figure 9B:
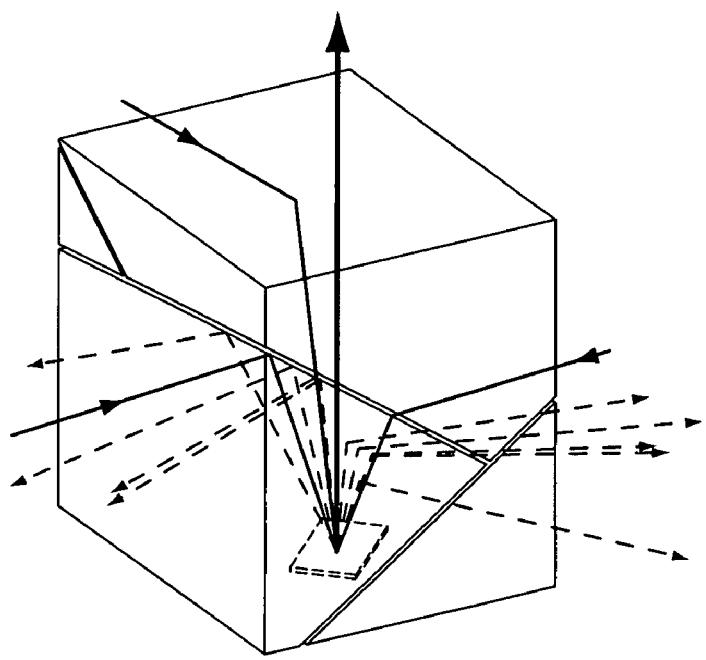
FIG. 9B shows the input and output beams in the assembly of FIG. 9A.

FIG. 9B illustrates the input and output beams in the TIR prism assembly 204 of FIG. 9A. Angles of the rays are adjusted since they are refracted by the prism glass. This is in effect a superimposition of the rays of light for all four positions of the quadstable mirror. Input and projected beams are represented by solid lines, whereas the nine "off" state beams are represented by dashed lines. The prism assembly 204 shown without any hidden edges is overlaid on the beams.

For a TIR prism assembly as described to work properly, most of the beams displayed in the figure must undergo total internal reflection at one of the prism interfaces. The critical angle for total internal reflection for a standard glass such as BK7 is approximately 41.8°. Angles greater than this will reflect and angles less than this will transmit through the interface, and a prism assembly must be designed to accomplish this for all beams. This is complicated by the fact that the input and output beams represented here by a single direction vector can be more accurately depicted as an angular distribution of light rays, and also that one should not bring a beam toward an interface too close to the critical angle, especially from less than the angle, or unpredictable behavior may result.

Whereas as few as possible prism interfaces are preferable in such a prism assembly, since light losses are inevitable at each interface, it may be necessary to add one or more prisms to a final prism assembly. The reason for this is to allow a greater solid angle of light cone onto the SLM. The most efficient projector will precisely match the light gathering capability of the projection lens with the cone of light reflecting off the SLM surface. Although the prism assembly 204 as described will transmit and reflect all of the incoming and outgoing beams properly, angular tolerances are fairly tight, and using a light cone of profile greater than several degrees is difficult. Adding one or more surfaces will allow a larger light cone from the illumination system to be used. Although this may add to the size of the prism assembly and could lead to additional losses at the extra interfaces, nevertheless light output of the system may be improved. Alternatively, if the micromirror devices can be fabricated to increase their tilt angles, greater separation between beams may be achieved and larger light cones may be used.

Figure 2A:
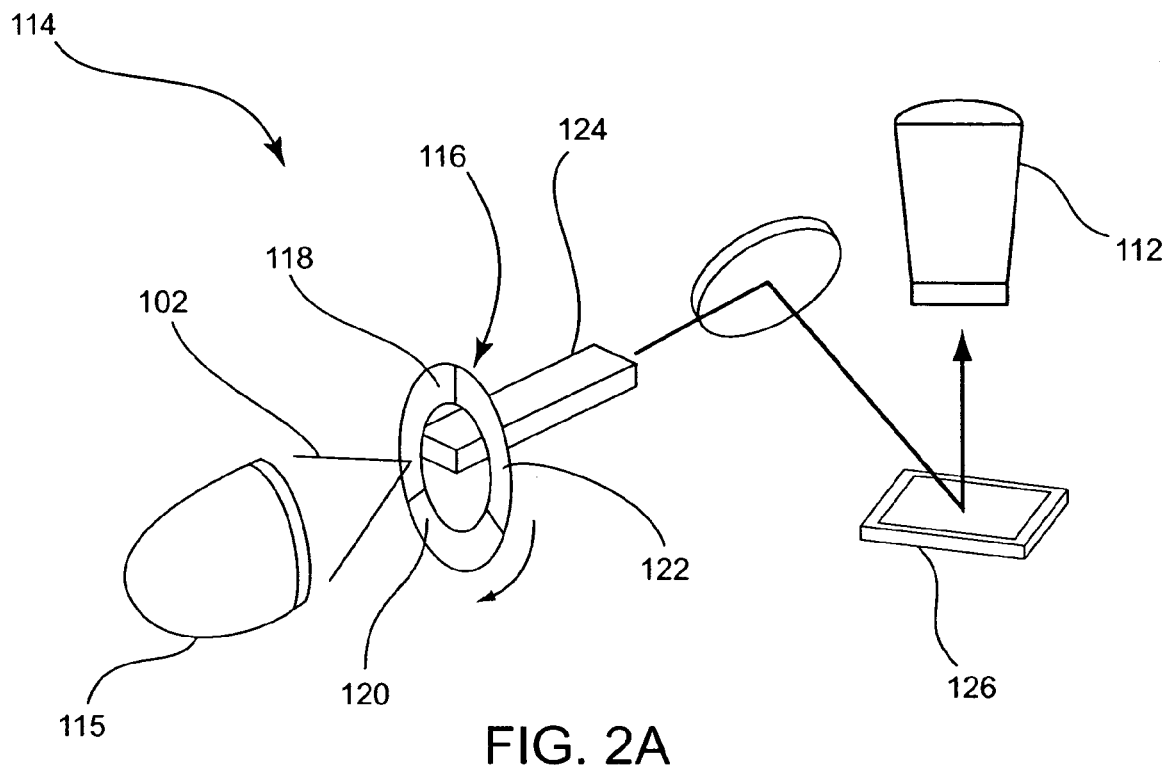
FIG. 2 is a perspective view showing a conventional single panel projection system using a color wheel.

Some advantages of the present invention that have heretofore not been addressed are in the area of color. Standard lamps used in video projector systems such as mercury halide or mercury vapor are very bright and reasonably power efficient, but often have unbalanced color spectra. The output of a typical mercury halide lamp generally exhibits higher intensity toward the blue end of the spectrum than at the green end. The red intensity from such a lamp is noticeably deficient. In a standard color wheel projector such as shown in FIG. 2A, the time spent modulating each color is fixed by the position of the color wheel. One solution toward balancing the color of the lamp to give a natural looking white color in the projected image is by reduction of the brightest colors through modulation, in effect bleeding off some of the light. For a lamp spectrum that exhibits somewhat higher lumens in the blue range and much fewer in the red range, that means the SLM would spend more "off" time in blue and green compared to the red portion of the cycle. However, this approach reduces the dynamic range and is not an efficient use of the power of the lamp. In another solution, the color wheel itself is unbalanced spatially, such that the blue and green sections of the wheel have less area than the red section. While this is effective at balancing out the color spectrum and power usage of the lamp, it also tends to exaggerate any visible artifacts in the image, especially those in the color segment that is the shortest, like blue in this example.

Figure 2B:
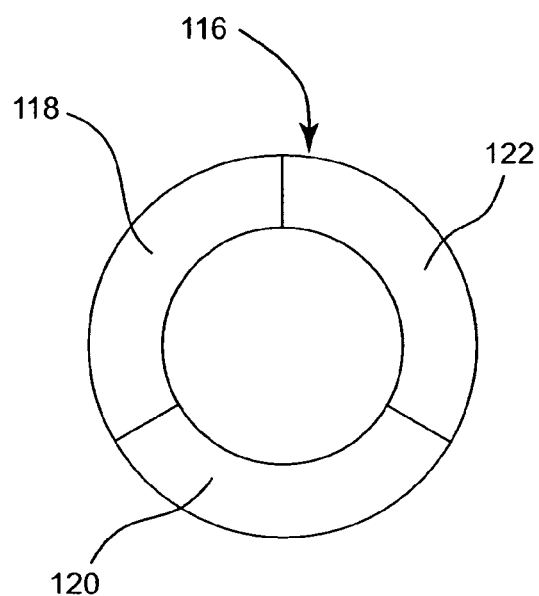
Figure 2C:
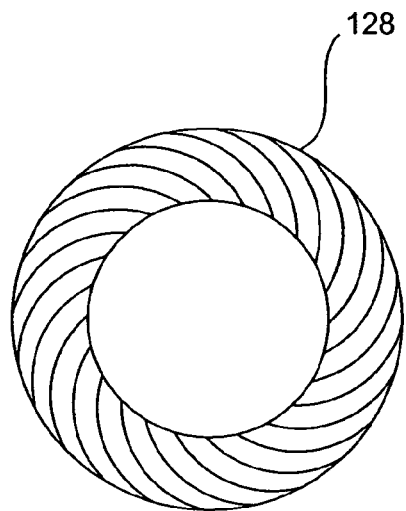
Figure 3A:
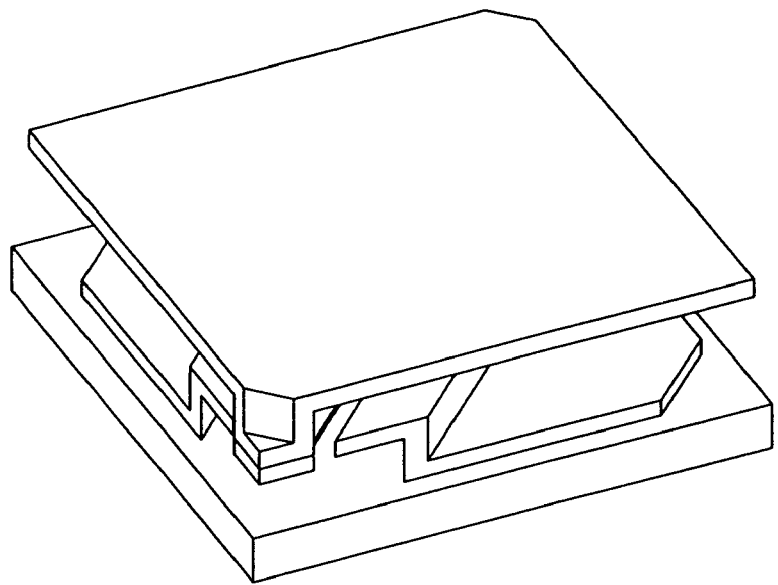
FIG. 3A and FIG. 3B are perspective views of a conventional single axis bistable mirror, with and without the mirror top, respectively.
Figure 3B:
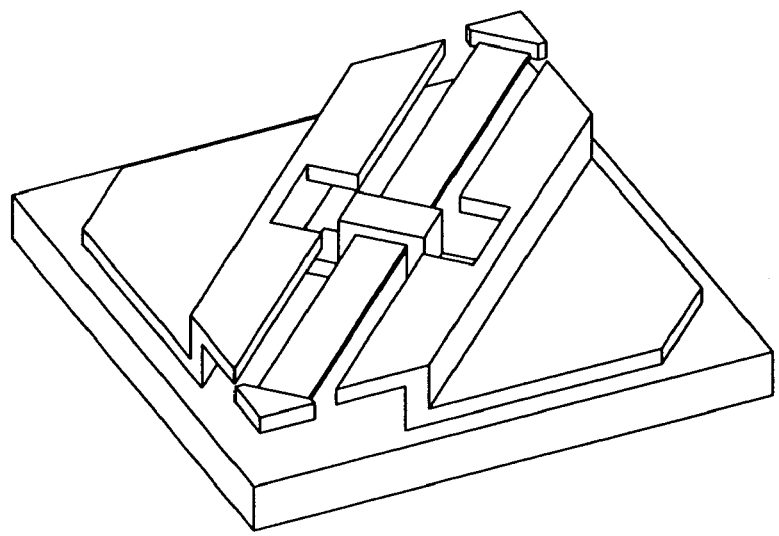

Because the timing of the mirrors of the present invention is easily adjustable, color correction is much simpler. The time spent by the mirrors at each of the three input colors can be weighted to adjust the color as desired. This does not add artifacts to the resulting image, since the cycling between the colors is much faster than the displayed frame rate, and color changes between each frame are nearly instantaneous. This correction can be done without adversely affecting the dynamic range nearly as much as by reducing the brightest color. The reason for this is that in the present invention, the time spent at the brightest color can be reduced, and this time can be added to the dimmer color or colors. Using a simple evenly divided color wheel as seen in FIG. 2B, no one portion of the spectrum can be seen more than 33% of the time. Thus, only reductions of any portion of the spectrum can be made.

However, in the present invention, time taken from one color may be added to a different color. For example, a balanced white pixel might be divided into 29% blue, 32% green, and 39% red. For most lamps, barring extreme imbalance in the color spectrum, correction can be made without adversely affecting the output. Because the balancing occurs in the control electronics of the projector, the amounts of each color portion can be adjusted dynamically to fine tune balance for individual lamp differences, and may also be able to adjust the balance if relative intensities shift over the lifetime of the lamp.

Using a similar principle, other improvements can be made to the color output of the device. Assuming a balanced light source (equal amounts of red, green, and blue in lumens) a single-panel color wheel projector only uses ~33% of the total light from the projector lamp at a maximum white pixel. Individual primary color pixels will therefore use ~11% of the total light. As the colors become more unsaturated, they tend to use more of the brightness available. A projector according to the present invention is able to increase the light intensity available at more saturated colors. To illustrate this, consider a fully saturated red pixel. For one third of the time, the pixel will be in the "red" state, using ~11% of the light flux. Because this pixel is saturated, it needs no time at all in the "blue" or "green" states. A pixel in a color wheel projector could only point toward the "off" direction during the blue and green sections of the color wheel, but the present invention is not limited by this, and a pixel potentially could stay in the "red" position through the entire cycle, leading to an extremely intense red color at that pixel. The pixel would not actually appear three times brighter than a color wheel pixel because visual response to brightness is nonlinear, but there would be a perceived increase in brightness.

Figure 10:
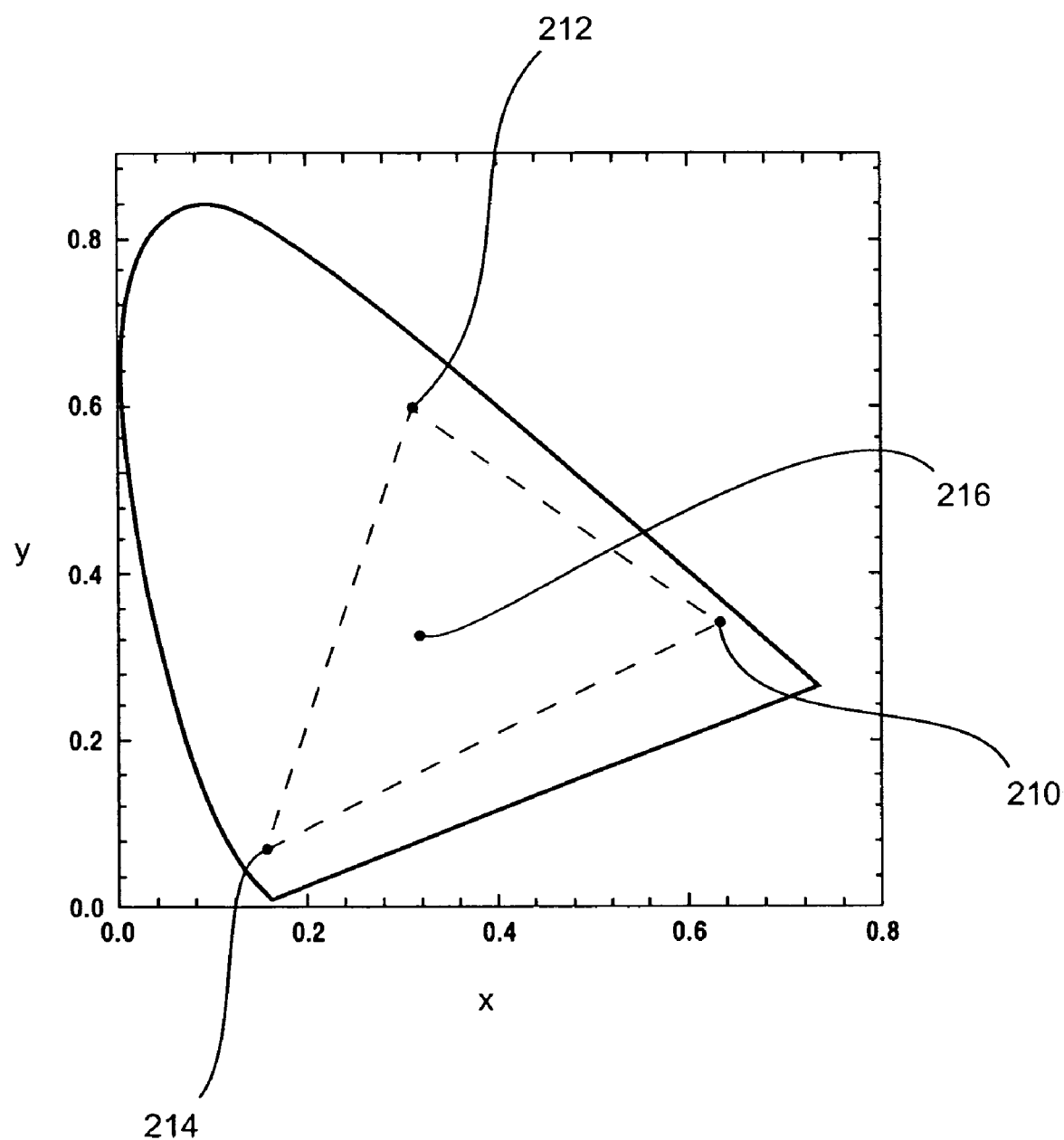
FIG. 10 is a diagram describing the color gamut and color space of the present invention.

The color gamut of a projection system is determined by the light sources used to create the various colors. FIG. 10 shows the standard CIE 1931 standard XYZ plot for quantifying the various hues of the spectrum. The three spectral portions used in a standard color wheel projector are placed on this plot at three points (210, 212, 214). The specific places of each point can be calculated by integrating its intensity over its spectral composition. Only colors inside the triangle formed by these three points can be produced, and so the size of the reachable color gamut of a system is dependent on the position of these points. Saturated colors appear closer to the edge of the CIE plot whereas unsaturated colors appear closer toward the center where the "white" point 216 lies, which itself must be defined for a given system. Position of the points as plotted here is arbitrary and need not be representative of a particular choice of colors. The size of the color gamut could be increased by proper choice of color filters. If very saturated colors were chosen for the three primary colors of the system, the largest range of colors would be produced, but generally they would be produced at a much lower brightness as much of the light from the lamp would be discarded. Desaturating the primary points by broadening their spectra increases the brightness but lowers the available number of colors. In most cases, filters and beamsplitters must be chosen as a compromise between overall brightness and color reproduction.

The same is true for the present invention, however the color diagram of FIG. 10 does not completely describe the color space. True color space is three-dimensional and also includes the brightness at each color level. The techniques used in the present invention do not expand the range of colors reproduced, however they do expand the potential color space by allowing much more brightness as colors move to saturation. Even relatively unsaturated colors may still receive a boost to their brightness level. In addition, comparatively saturated colors may give an apparent increase in the color gamut. Thus, for example, with the greater apparent brightness, further distant points (210', 212', 214') could be selected to give the same brightness thereby offering an enlarged color gamut. Conceivably, a fourth or more colors, such as one represented by point 218, could be added, further improving the range of color gamut. Video reproduction using the standard gamut may only be able to use a portion of the added color space available when using the present invention to avoid oversaturation of natural colors, but some increase in overall brightness for a given projector lamp should be able to be achieved. Greater increases in brightness may occur in the field of business graphic presentations, where brighter saturated colors are often desirable and a nonstandard color gamut is more practical.

As for any further constructional details of components of the subject invention, it is to be understood that conventional materials and techniques may be employed in their construction, use or application. In addition, those with skill in the art may appreciate various modifications, refinements or improvements that fall within the general scope of the present invention. Further, one may appreciate a means or manner that is presently known or later-developed which is not disclosed herein, but that satisfies the purpose of function of a given element or item. Though the invention has been described in reference to several examples, optionally incorporating various features, the invention is not to be limited to the embodiments or the applications described herein. For example, the invention may be used in other imaging applications such as holographic storage.

What is claimed is:

1. A micromirror device comprising:
an imaging lens assembly; and
an array of micromirrors, wherein each of the micromirrors simultaneously receives a plurality of light beams including a red light beam, a green light beam, and a blue light beam, and wherein a position of a micromirror in the array of micromirrors is adjustable such that the micromirror selects one of the plurality of light beams to direct toward the imaging lens assembly;
a TIR prism assembly that receives light beams moving toward and away from the array of micromirrors, the TIR prism assembly including four prisms that form three interfaces.

2. The device of claim 1, wherein the interfaces comprise:
a first interface that reflects the red light beam;
a second interface that reflects the green light beam; and
a third interface that reflects the blue light beam.

3. The device of claim 2, wherein the first interface and the second interface deflect a light beam away from the imaging lens assembly if the micromirror is positioned to direct the light beam away from the imaging lens assembly.

4. A micromirror device comprising:
an imaging lens assembly; and
an array of micromirrors, wherein each of the micromirrors simultaneously receives a plurality of light beams, wherein a position of a micromirror in the array of micromirrors is adjustable such that the micromirror selects one of the plurality of light beams to direct toward the imaging lens assembly, and wherein the micromirror is a multi-axis micromirror with positions adjustable along different axes.

5. A micromirror device comprising:
an imaging lens assembly; and
an array of micromirrors, wherein each of the micromirrors simultaneously receives a plurality of light beams, wherein a position of a micromirror in the array of micromirrors is adjustable such that the micromirror selects one of the plurality of light beams to direct toward the imaging lens assembly, and wherein the micromirror comprises a cross-shaped hinge that allows torsional rotation of a mirror around two axes of the cross-shaped hinge.

6. A method of displaying an image, the method comprising:
simultaneously directing a plurality of light beams on an array of micromirrors;
individually controlling a position of each of the micromirrors such that each of the micromirrors selectively reflects one of the light beams toward an imaging lens assembly, wherein controlling the position of each of the micromirrors comprises rotating the micromirrors around one of multiple axes of rotation.

7. A display device comprising a micromirror device, wherein the micromirror device includes:
an imaging lens assembly; and
an array of micromirrors, wherein each of the micromirrors simultaneously receives a plurality of light beams, and wherein a position of a micromirror in the array of micromirrors is adjustable such that the micromirror selects one of the plurality of light beams to direct toward the imaging lens assembly, wherein the plurality of light beams comprise a red light beam, a green light beam, and a blue light beam.

8. The device of claim 7 further comprising a TIR prism assembly that receives light beams moving toward and away from the array of micromirrors, the TIR prism assembly including four prisms that form three interfaces.

9. The device of claim 8, wherein the interfaces comprise:
a first interface that reflects the red light beam;
a second interface that reflects the green light beam; and
a third interface that reflects the blue light beam.

10. The device of claim 9, wherein the first interface and the second interface deflect a light beam away from the imaging lens assembly if the micromirror is positioned to direct the light beam away from the imaging lens assembly.

11. A display device comprising a micromirror device, wherein the micromirror device includes:
  an imaging lens assembly; and
  an array of micromirrors, wherein each of the micromirrors simultaneously receives a plurality of light beams, and wherein a position of a micromirror in the array of micromirrors is adjustable such that the micromirror selects one of the plurality of light beams to direct toward the imaging lens assembly, wherein the micromirror has two or more possible positions to select from, and wherein each of the possible positions is configured to direct a unique one of the plurality of light beams toward the imaging lens assembly.

12. A display device comprising a micromirror device, wherein the micromirror device includes:
  an imaging lens assembly; and
  an array of micromirrors, wherein each of the micromirrors simultaneously receives a plurality of light beams, and wherein a position of a micromirror in the array of micromirrors is adjustable such that the micromirror selects one of the plurality of light beams to direct toward the imaging lens assembly, wherein the micromirror is a multi-axis micromirror with positions adjustable along different axes.

13. A display device comprising a micromirror device, wherein the micromirror device includes:
  an imaging lens assembly; and
  an array of micromirrors, wherein each of the micromirrors simultaneously receives a plurality of light beams, and wherein a position of a micromirror in the array of micromirrors is adjustable such that the micromirror selects one of the plurality of light beams to direct toward the imaging lens assembly, wherein the micromirror comprises a cross-shaped hinge that allows torsional rotation of a mirror around two axes of the cross-shaped hinge.

14. A display device comprising a micromirror device, wherein the micromirror device includes:
  an imaging lens assembly, wherein the imaging lens assembly is a projection lens assembly; and
  an array of micromirrors, wherein each of the micromirrors simultaneously receives a plurality of light beams, and wherein a position of a micromirror in the array of micromirrors is adjustable such that the micromirror selects one of the plurality of light beams to direct toward the imaging lens assembly.

* * * * *